US008827147B2

(12) United States Patent
Cameron et al.

(10) Patent No.: US 8,827,147 B2
(45) Date of Patent: Sep. 9, 2014

(54) DUAL PROPRIETARY AND UNIVERSAL MOBILE BARCODE READER

(71) Applicants: Jon Cameron, Dallas, TX (US); Howard Brawdy, Dallas, TX (US)

(72) Inventors: Jon Cameron, Dallas, TX (US); Howard Brawdy, Dallas, TX (US)

(73) Assignee: Best Buzz, Dallas, TX (US)

( * ) Notice: Subject to any disclaimer, the term of this patent is extended or adjusted under 35 U.S.C. 154(b) by 91 days.

(21) Appl. No.: 13/706,049

(22) Filed: Dec. 5, 2012

(65) Prior Publication Data

US 2013/0092733 A1  Apr. 18, 2013

Related U.S. Application Data

(62) Division of application No. 13/136,537, filed on Aug. 4, 2011, now abandoned.

(51) Int. Cl.
*G06F 17/00* (2006.01)
*G06Q 30/00* (2012.01)
*G06F 17/30* (2006.01)

(52) U.S. Cl.
CPC .... *G06F 17/30879* (2013.01); *G06F 17/30002* (2013.01)
USPC ........................................ 235/375; 705/26.61

(58) Field of Classification Search
CPC ................................................. G06F 17/30879
USPC .............. 235/454, 375, 462.08–462.11, 383, 235/385; 705/26.61–26.64
See application file for complete search history.

(56) References Cited

U.S. PATENT DOCUMENTS

| 5,804,803 | A  | * | 9/1998  | Cragun et al. ........... 235/375 |
| 5,978,773 | A  |   | 11/1999 | Hudetz |
| 6,027,024 | A  |   | 2/2000  | Knowles |
| 6,076,733 | A  |   | 6/2000  | Wilz, Sr. |
| 6,266,649 | B1 |   | 7/2001  | Linden |
| 6,430,554 | B1 |   | 8/2002  | Rothschild |
| 6,448,979 | B1 |   | 9/2002  | Schena |
| 6,542,933 | B1 |   | 4/2003  | Durst, Jr. |
| 6,651,053 | B1 | * | 11/2003 | Rothschild ............. 707/770 |
| 6,736,322 | B2 |   | 5/2004  | Gobburu |
| 6,753,883 | B2 |   | 6/2004  | Schena |
| 6,766,363 | B1 |   | 7/2004  | Rothschild |
| 6,865,608 | B2 |   | 3/2005  | Hunter |
| 6,993,573 | B2 |   | 1/2006  | Hunter |
| 7,156,311 | B2 |   | 1/2007  | Attia |
| 7,206,820 | B1 |   | 4/2007  | Rhoads |
| 7,496,638 | B2 |   | 2/2009  | Philyaw |

(Continued)

FOREIGN PATENT DOCUMENTS

| WO | WO/00/43862 A1 | 1/2000 |
| WO | WO/00/70585 A1 | 11/2000 |
| WO | WO/2004/080097 A1 | 9/2004 |

OTHER PUBLICATIONS

Neomedia Technologies, 2D Mobile Barcodes—A Definitive Guide, White Paper, Dec. 2010, Atlanta, GA, USA, p. 5, paragraph 3 to p. 9, paragraph 2.

*Primary Examiner* — Michael G Lee
*Assistant Examiner* — Suezu Ellis

(57) ABSTRACT

A method of presenting content to viewers in a computer network environment which includes scanning a barcode (10) with a mobile device (100), retrieving content (130) directly associated with the barcode (10), and retrieving associated proprietary content (214). The dual content is then separately displayed on said mobile device (100).

6 Claims, 4 Drawing Sheets

(56) References Cited

U.S. PATENT DOCUMENTS

Figure 1:
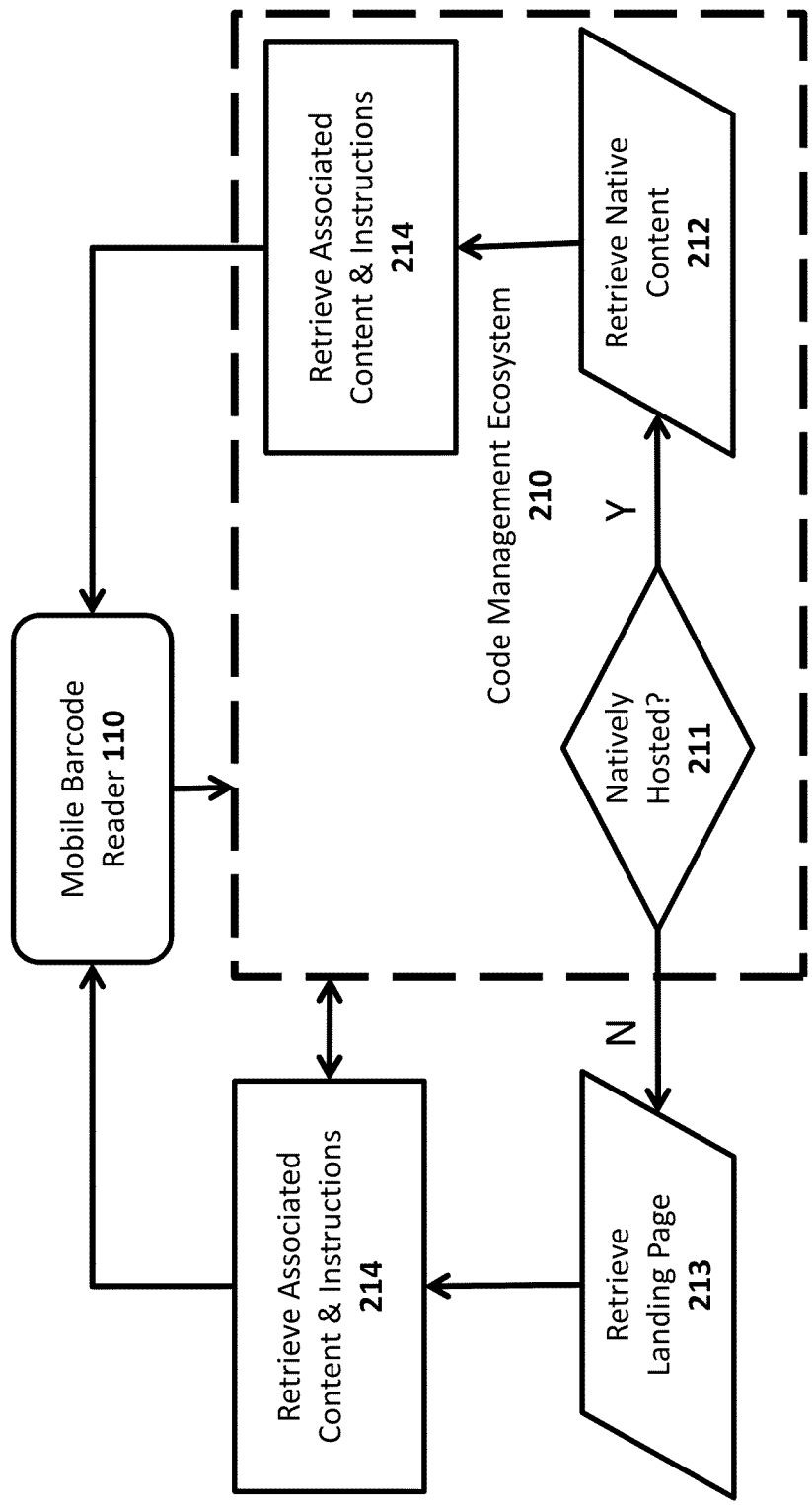

| | | |
|---|---|---|
| 7,890,368 B2 | 2/2011 | Lambert |
| 7,917,390 B2 | 3/2011 | Feinberg |
| 7,945,476 B2 | 5/2011 | Subramanian |
| 2007/0181691 A1 | 8/2007 | Chang |
| 2014/0089142 A1* | 3/2014 | Jackovin .................... 705/26.61 |

* cited by examiner

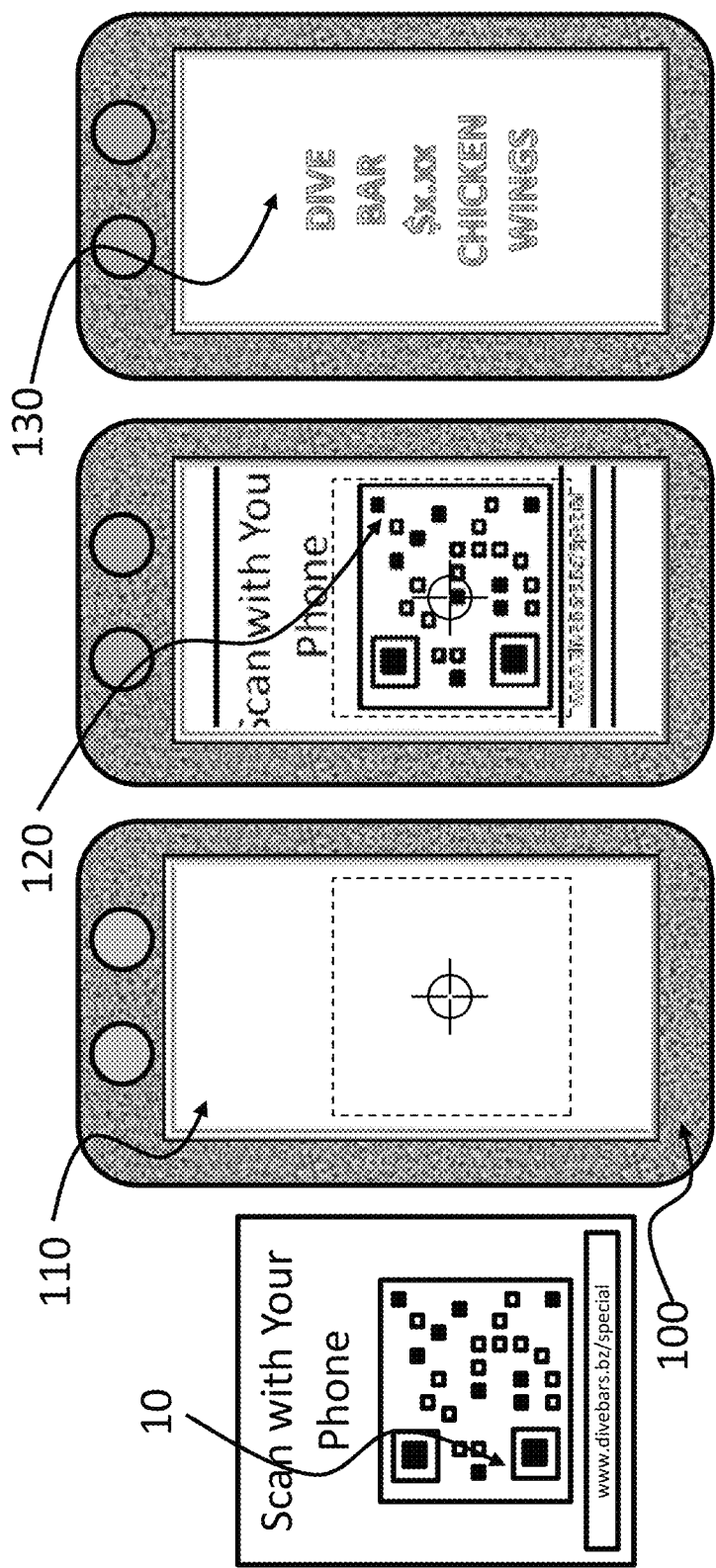

DUAL PROPRIETARY AND UNIVERSAL MOBILE BARCODE READER

CROSS-REFERENCE TO RELATED APPLICATIONS

This application is a divisional application of Ser. No. 13/136,537 entitled "Combined Proprietary and Universal Mobile Barcode Reader" filed on Aug. 4, 2011 and is co-pending with divisional application Ser. No. 13/693,219 entitled "Combination Proprietary and Universal Mobile Barcode Reader" filed on Dec. 4, 2012.

BACKGROUND

1. Field of Invention

The invention related to the system and method of combining the characteristics of a proprietary mobile barcode reader with a universal reader so all barcode scans can be associated with content native to the reader.

2. Background of the Invention

The present invention combines features associated with universal mobile barcode readers with the desirable benefits of proprietary mobile barcode readers.

Mobile barcode scanning is the process where an individual will employ a mobile device enabled with a camera and connected to the internet. The user will download and install software that permits the mobile device to use the camera to detect the presence of a standardized barcode. In various embodiments, the mobile device's application will decode the contents embedded in the barcode and perform a menu of functions. These functions can include any capability available through web browsing or executables on the mobile device. For instance, a user could browse for competitive prices, search for local establishments, dial a phone number or fill in a contact's information. The barcode acts a catalyst for the subsequent actions and simplifies the processes required to manually perform the same functions.

Universal Readers

Universal mobile barcode readers are a fixture of mobile devices such as telephones. They allow uniform access to web pages by scanning any directly encoded barcode which then automatically points the user to the landing page directly encoded in the space of the barcode. Directly encoded barcodes have a fully-formed Uniform Resource Locator, or URL, embedded in the space of the barcode and represent an industry standard. They provide the perception of a consistent experience for the consumer since any universal reader can read any directly encoded barcode.

Brand managers are finding that the use of these direct codes are causing them to lose control of their brand identity and messaging. For instance, there is no way to assure consumers a branding message was delivered by the actual brand owner. Any company or individual can produce a direct barcode that executes to a destination page created without brand permission.

These universal readers all scan common barcode symbologies approved by various industry groups across the world. Typical barcode symbologies in use for mobile barcode scanning are Quick Response (QR) and Datamatrix (DM). Early in the formation of the market for mobile barcodes, these standards were released for public use in the creation of barcodes. These barcode creators allow for any information to be recorded and have no supervision or regulation.

Today, the dominant symbology scanned on universal readers is an indirectly coded barcode such as Universal Product Code, or UPC. The indirectly encoded barcode is only encoded with an index approved by the product's or advertiser's owner. It does not contain a URL or address information and relies on the barcode reader to determine the specific process for retrieving associated information and performing subsequent transactions. These codes were originally designed to provide commercial transactions with a consistent identification for shipping, inventory, planning and sale. These indirect barcodes resulted in millions of databases containing disparate information about the index that allowed the businesses to operate in proprietary and useful ways for the individual business. The product's manufacturer had little control over the data associated with their product's UPC but this incongruent solution resulted in relatively minor problems. This relatively has changed dramatically with escalating consumer use of UPCs, and the associated indirect symbologies such as Japanese Article Number (JAN) and European Article Number (EAN).

The UPC can be used by any enterprise, authorized or not, to direct the user to content. Product manufacturers have organized in large groups to determine how to control the output seen by consumers when a UPC is scanned by mobile barcode readers. Providing consumers with consistent information related to a UPC is seen as a very desirable outcome. For instance, if a consumer were to scan a drug barcode, they would be provided with up-to-date information on drug interactions, allergies, descriptions, warnings, storage requirements or recalls. Without this standardization, the scanning of the drug could, for instance, lead the consumer to an alternate site selling counterfeit versions of the drug. These alarming possibilities have lead to a second type of reader called a Proprietary Reader.

Proprietary Reader

A proprietary reader varies from a universal reader because it either:

Reads and decodes a proprietary symbology that unapproved readers cannot decode.

Uses a proprietary encoding pattern that unapproved readers may be able to decode, but are unable to interpret the output. These encoding patters do not contain a fully-formed URL and so are unmanageable by universal readers.

In either case, the end-user, usually an untrained consumer, must visually match the proprietary barcode to the appropriate proprietary reader. If they fail to do so, the process will yield an error.

While once considered a fringe application that was undesirable for use with consumers, proprietary readers are today being designed and deployed by the largest application suppliers in the industry.

For consumers, these proprietary readers produce a number of problems and are generally believed to cause confusion in the marketplace. A standard barcode, which would normally scan with a universal reader, would be rendered useless if it didn't contain a URL, but instead contained a proprietary index or addressing system. This leaves the consumer responsible for identifying the appropriate proprietary reader even if they are attempting to scan a standardized barcode.

Other problems arise when an unfamiliar proprietary symbology is used that may be unidentifiable to the consumer as a barcode. In all, proprietary readers provide no tangible advantages to the end-user. For this reason, most industry advocates in mobile barcodes are critical of the deployment of proprietary readers.

For brand managers, proprietary readers offer solutions to improve security. Proprietary readers often use encoded indexes or proprietary symbologies that cannot be created by counterfeiters. Proprietary readers may be retailer-specific so they only display content approved their vendors. Proprietary readers can be updated daily with fresh content or critical information streams such as recalls. The problem with aged information on internet sources is eliminated.

However, proprietary readers are also a cause for concern by brands. Proprietary readers require a savvy consumer with the available proprietary application installed on their mobile device. This can significantly reduce the response rate of a national advertising campaign and tarnish the reputation of a brand by frustrating consumers.

There are inherent problems with both proprietary mobile barcode readers and universal mobile barcode readers:

Universal readers use unencrypted coding. The ability of anyone to create a QR code or UPC makes it impossible for the universal reader to distinguish an authorized barcode from a counterfeit barcode. It will process both barcodes as if they had equal integrity.

Universal readers are difficult to monetize. Typically universal readers are supplied by campaign managers. Campaign managers act similar to advertising agencies and generate revenue when their barcode is scanned. Unlike a proprietary reader, the universal reader is only able to monetize a fraction of the scans made by the application. Campaigns generated by their competition are processed for free.

Universal readers don't allow brands to control their messaging. The most common example is the use of UPCs by consumers. While issued and owned by the brand, anyone can deploy another's UPC to drive consumers to unauthorized web pages including those that provide counterfeit products.

Proprietary readers require consumers to determine the source of QR codes prior to scanning. Even when using a standard symbology, such as QR, a universal reader is unable to process a code with proprietary encoding.

Proprietary readers limit available information. A proprietary barcode reader is designed to provide quality information to the consumer. However, this can also limit the use of the barcode to produce an undesirable outcome to the consumer. For instance, a consumer may wish to look for a local retailer, but the proprietary barcode may only supply online sources.

Proprietary readers reduce participation. If proprietary readers are deployed in a consumer advertising campaign, the rate of response is limited to consumers who have access to a proprietary reader or are willing to install a proprietary reader in order to decode the message.

SUMMARY OF THE INVENTION

An invention, which meets the needs stated above, is a system and method combining the advantages of a proprietary mobile barcode reader with the accessibility of a universal reader.

DRAWING FIGURES

The accompanying drawings, which are incorporated in and constitute a part of this specification, illustrate embodiments of the present invention and together with the description, serve to explain the principles of this invention. In the figures;

FIG. 1.—Flow chart depicting the data movement within the mobile and server system.

FIG. 2A.—Drawing showing the elements of the standard mobile barcode reader with a 2D barcode.

Figure 2B:
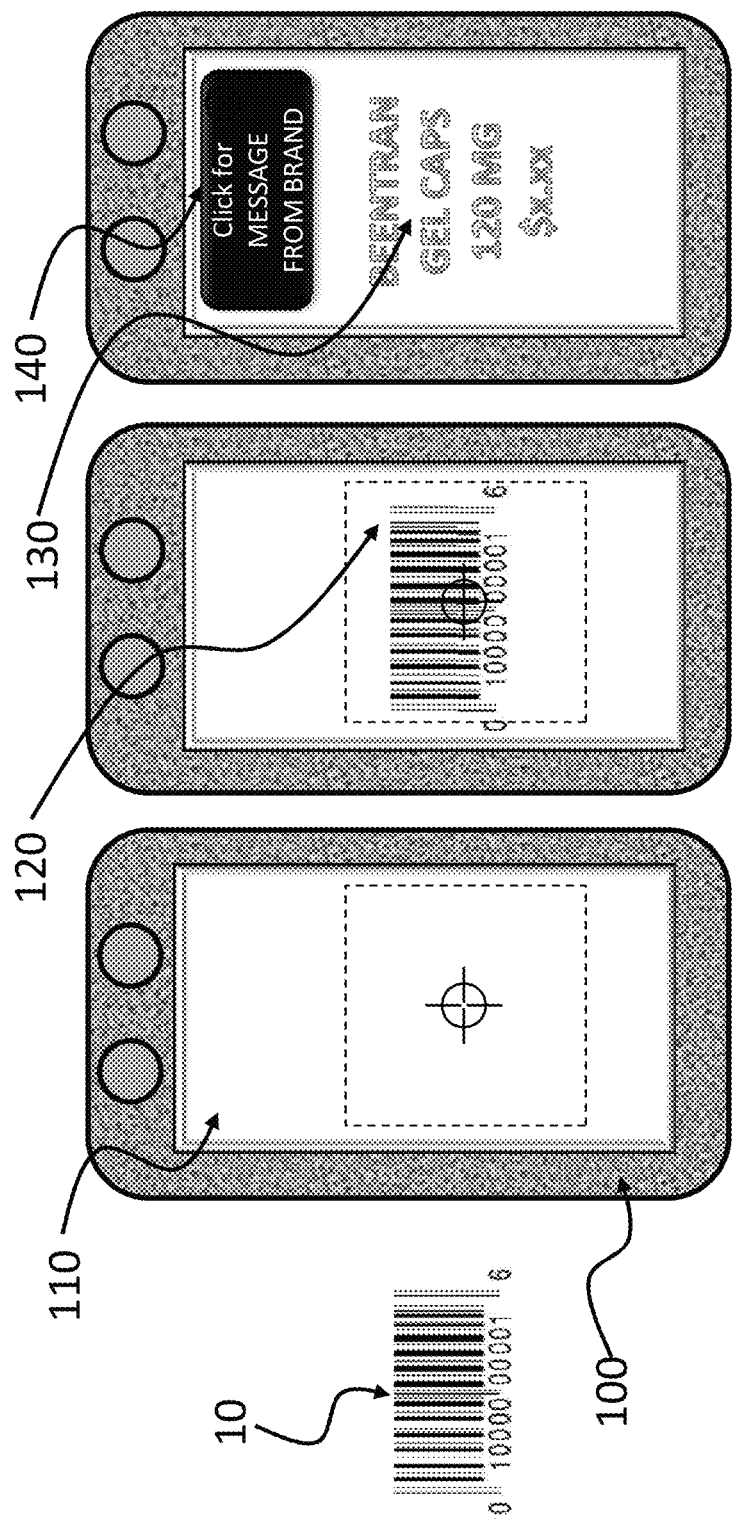

FIG. 2B.—Drawing illustrating the use of the invention to simultaneously display both brand owner's content and retail content.

Figure 2C:
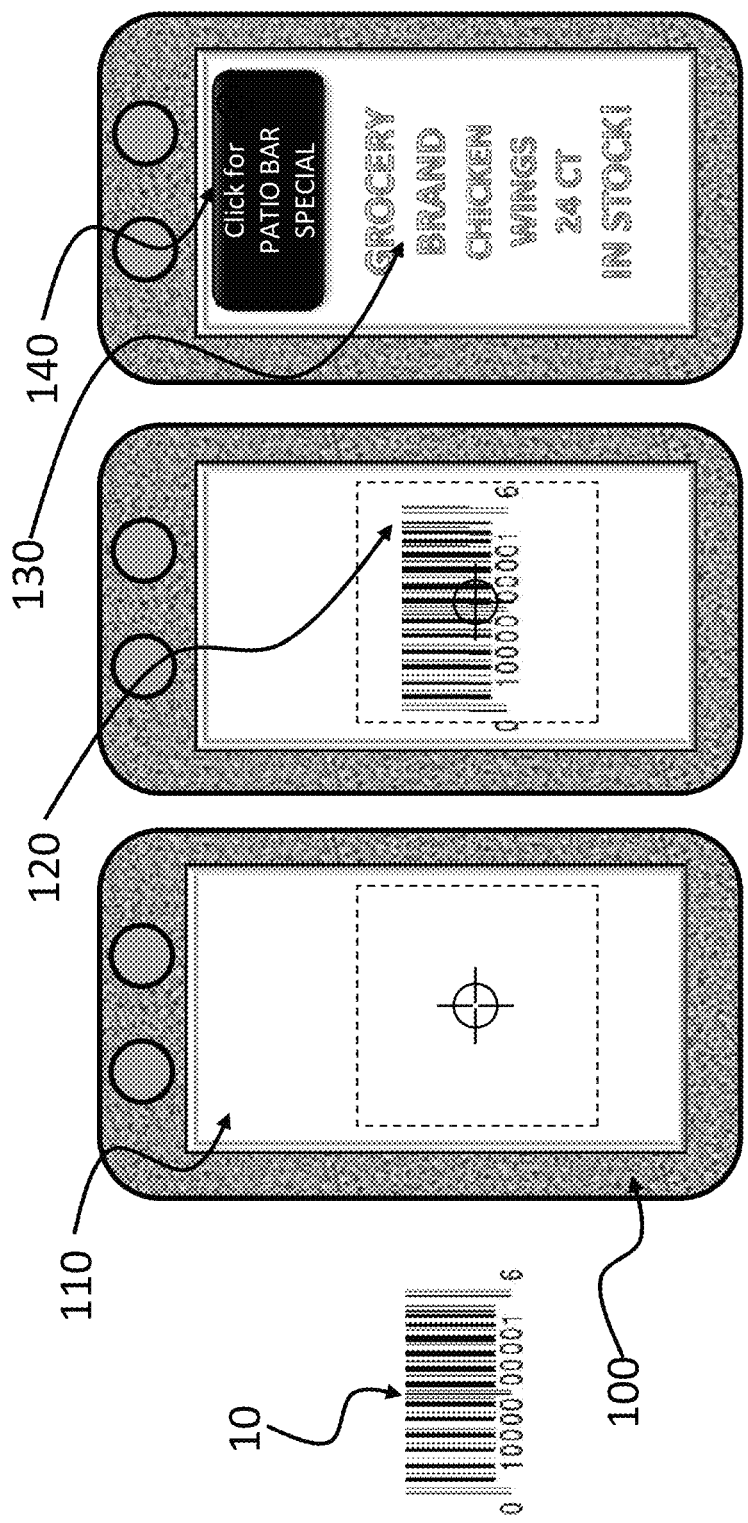

FIG. 2C.—Drawing depicting the apparatus being used with a third-party barcode.

REFERENCE NUMERALS IN DRAWINGS

10 Barcode, Barcode Label, UPC, 2D Barcode
100 Mobile Device
110 Barcode Reader, Mobile Barcode Reader, Barcode Reader, Mobile Barcode Reader
120 Scanning, Mobile Scanning, Scan
130 Destination Land Page, URL, Destination URL, Alphanumeric String
140 Associated Content Message Display
210 Code Management Ecosystem, Code Management Platform, Clearinghouse, Barcode Management, Data Storage File
211 Natively Hosted Query, Natively Hosted
212 Native Content
213 Third-Party Content, Third-Party Landing Page
214 Associated Content and Instructions, Associated Content

DETAILED DESCRIPTION OF THE DRAWINGS

Referring to the drawings, in which like numerals represent like elements,

FIG. 1

Turning to FIG. 1, the logic flow chart depicts barcode 10 data movement across the mobile device 100 and the code management ecosystem 210 to return content to the mobile device 100. In the specifications, content refers to native content 212 and/or third-party content 213. A mobile barcode reader 110 decodes the barcode 10 and forwards the decoded alphanumeric string 130 of the barcode 10 to the code management ecosystem 210. This clearinghouse 210 is responsible for communications with the mobile device 100 and managing the associations between the barcode's 10 decoded string 130 and the content delivered to the mobile device 100. After receiving the string 130, the clearinghouse 210 determines if the string's 130 content is natively hosted 211 within the clearinghouse 210. If the clearinghouse 210 determines the content is natively hosted 211, the clearinghouse 210 retrieves the native content 212 and relays the content to the mobile barcode reader 110. In a typical proprietary mobile barcode reader 110 application in the prior art, if the ecosystem 210 determined the content was not natively hosted 211, a) an error would be returned to the barcode reader 110; b) the third-party landing page 213 would be retrieved and displayed in the barcode reader 110; or c) a default browser search would be performed and delivered to the barcode reader 110 as a search.

In this embodiment of the present invention, the clearinghouse 210 determines the content is not natively hosted 211, the mobile barcode reader 110 will instead be instructed to display the third-party landing page 213 and then additionally receive associated content and instructions 214. The instructions to the barcode reader 110 are for displaying the associated content 140 within the confines of the barcode reader 110 application. Consequentially, the barcode reader 110 shows the unaltered foreign landing page 213. This addition of the associated content and instructions 214 permits authorized brand managers to supplement externally generated content, such as retail content, with trusted content authorized by the manufacturer or advertiser.

If the clearinghouse 210 determines the content is natively hosted 211, the mobile barcode reader will be instructed to display the native content 212 on the mobile device 100. In addition, the mobile barcode reader 110 is instructed to display secondary associated content 140. This addition of the associated content and instructions 214 permits authorized brand managers to supplement their content, such as a video advertisement, with trusted secondary content authorized by the manufacturer, such as legally required dissemination of information.

Those skilled in the art will also recognize that the environment illustrated in FIG. 1 is not intended to limit the present invention. Indeed, those skilled in the art will recognize that other alternative hardware environments may be used without departing from the scope of the present invention.

FIG. 2A

Referring now to FIG. 2A, the drawings show a typical mobile barcode reader 110 application. The user is first presented with a barcode 10 and then must launch a barcode reader 110 on their mobile device 100. The consumer places the camera in the mobile device 100 over the barcode 10 so it aligns with the barcode reader 110. In various manners, the camera on the mobile device 100 will capture an image of the barcode 10. The barcode reader 110 may then decode the barcode 10 to produce an alphanumeric string 130 or simply forward the barcode 10 image to an external server-based processor to decode. Once the barcode 10 is decoded, the barcode reader 110 may retrieve the encoded landing page 212/213 and display this on the mobile device 100. The barcode reader 110 may alternately forward the decoded alphanumeric string 130 or barcode 10 image to a code management ecosystem 210 which returns content to the mobile reader 110.

In the FIG. 2A example, the consumer scans 120 a 2D barcode 10 with their barcode reader 110 on their mobile device 100. The barcode reader 110 decodes the barcode 10 and displays the message "DIVE BAR $x.xx CHICKEN WINGS" stored at the URL directly encoded in the barcode 10. The barcode reader 110 does not need to have any previous knowledge or association with the destination URL in order to process this direct barcode.

FIG. 2B

FIG. 2B depicts the use of the invention to display both brand owner's content and local retail content simultaneously. In the case of UPCs 10, and other specific product identifiers, proprietary mobile barcode readers 110 are not widely employed. Proprietary barcode readers 110 which use UPCs 10 employ the software to divert the UPC 10 to content which is controlled by the owner of the proprietary reader. This is used for niche applications that may report on nutrition profiles, diabetic insulin response, the manufacturer's ethical treatment of animals, and the like. However, these barcode readers 110 are not able to additionally provide other types of associated content 214 that may be important to the consumer such as local availability or comparative pricing. So complex inquiries require the use of more than one barcode reader 110 and the user must be sophisticated enough to discern the output capabilities of various barcode readers 110.

The "Dual Proprietary and Universal Mobile Barcode Reader" simultaneously provides multiple types of valuable content to the consumer. In this preferred embodiment, the user scans 120 the UPC 10 with mobile barcode reader 110 located on the mobile device 100. The mobile reader 110 aligns with the barcode 10 and the camera captures an image of the barcode 10. The barcode scanner translates the indicia to an alphanumeric string 130 and completes the mobile barcode reading process 120. The translated string is sent to the code management system ecosystem 210. The code management system 210 processes the string 130 and returns appropriate content to the barcode reader 110. Simultaneously, the code management ecosystem 210 delivers associated content and an instruction 214. This associated content 214 could include critical information about the use, availability, or safety of the product. Alternately, it could also include other associated content 214 such as a marketing message. The instructions direct the barcode reader to display the associated content message 140 without altering the destination landing page 130.

FIG. 2B shows the example of a universal barcode reader designed to search and display local consumer price comparison deals. The consumer uses the mobile device's 100 barcode reader 110 to scan 120 a barcode 10 for the fictitious product "Beentran Gel Cap 120 MG." The base barcode reader 110 returns a local best price, but then also associated content 214 in the form of the associated content message 140 button suggesting the consumer "Click for MESSAGE FROM BRAND." This allows the barcode reader 110 to simultaneously display the output of their original inquiry, and also alert the user to important associated content 214 from the brand.

The retrieved third-party landing page 213 and the retrieved associated content and instructions 214 may both be owned by the same enterprise. For instance, the third-party landing page 213 may retrieve a video advertisement about "Beentran Gel Caps" and the associated content and instructions 214 will deliver a legally required dissemination of the approved "Beentran" packaging label in connection with the broadcast presentation.

FIG. 2C

Finally, turning to FIG. 2C demonstrates the use of the invention when a third-party barcode 10 is scanned 120 by a consumer. The user scans 120 the barcode 10 with the mobile barcode reader 110 located on a mobile device 100. The barcode reader 110 returns content 212/213 and displays an additional associated content message 140 within the barcode reader 110.

In the example of FIG. 2C, the user scans 120 a 1D barcode 10 with the mobile barcode reader 110. The barcode, or UPC 10, is associated with a specific consumer product found in a retail location. However, the 1D barcode 10 is not associated with any particular content and the barcode reader 110, possibly in combination with user selection, must choose what type of content will be supplied to the consumer. In FIG. 2C, the barcode reader 110 and consumer choose to check the availability of "GROCERY BRAND CHICKEN WINGS 24 CT." The barcode's 10 encoded index is decoded as "0 10000 00001 6" and that data string is forwarded by the barcode reader 110 to the code management ecosystem 210. This clearinghouse 210 matches the decoded index with the description "GROCERY BRAND CHICKEN WINGS 24 CT" and checks for availability in the user's local area. The clearinghouse 110 formats this content then returns the content to the barcode reader 110. Simultaneously, the code management ecosystem 210 matches the index string to associated content and instructions 214 and forwards this to the mobile barcode reader 110. Without interfering with the user's request for product availability, the barcode reader 110 offers the consumer an optional button for an alternative venue for "chicken wings" with the dismissible associated message 140 of "Click for PATIO BAR SPECIAL."

Advantages

From the description above, a number of advantages become evident for the "Dual Proprietary and Universal Mobile Barcode Reader." The present invention provides all new benefits for all participating parties including the advertiser, brand manager, campaign manager and consumer, including:

Allows unaltered retrieval of external content. A concern for both content owners and end-users is the barcode reader does not alter the content requested within the encoding of the barcode. The present invention addresses this concern by placing all additional messaging inside the application thereby causing no modifications to the original content. In addition, the present invention also does not interfere with the delivery of the content. Unlike many proprietary readers, advertisers are always assured consumers see the message and see it as conceived. For instance, some proprietary readers may "hijack" the final destination page and replace it with content such as a "green" index ratings, consumer reviews, an editorial of the destination owner's social responsibility, and the like. In the "Dual Proprietary and Universal Mobile Barcode Reader", the associated destination page is accurately displayed by delivering the associated foreign content without altering the original content. This provides the important advantage of not compromising copyrighted and trademarked material owned by an outside content provider, campaign manager, advertiser or brand.

Combines external content with associated internal content. Universal readers will only separately delivery external or internally supplied content. If the content is native, the individual destination is displayed. If the content is foreign, that single destination page is displayed. For the end-user, the disparate sources are delivered without distinction. The present invention can deliver content from the landing page associated with the barcode and then supplement the content with data provided by the application. The additional content delivered by the present application is associated with the barcode string. So while it is separate content, the related content may be useful to the end-user or consumer. This enhances or supplements the original destination page.

Allows campaign managers to capture new revenue. Traditionally, both universal and proprietary readers process a large number of barcodes in the code management ecosystem which do not have associated revenue-generating contracts. For instance, a mobile barcode reader supplied by "Campaign Manager A" (CMA) is often employed by an end-user to scan the barcode generated by competitor "Campaign Manager B" (CMB). CMA will still deliver the content generated by CMB's barcode and CMB bills their client for a "hit" to the landing page. Since the revenue-generating contract was obtained by CMB, CMA supplies the critical mobile barcode scanning application and code management ecosystem at no cost to competitor CMB. An analysis of data from code management systems indicates more than 90% of the transactions within private code management ecosystem are for non-revenue generating transactions. The "Dual Proprietary and Universal Mobile Barcode Reader" allows the campaign manager to generate income from competitive campaign manager's barcodes. For instance, a retailer may contract with CMA to execute an advertisement, which includes a barcode, for a cookie promotion at the retailer's stores. In the present invention, CMB may separately contract with the cookie manufacturer for an additional discount on the cookie product at any retailer's location. Both CMA and CMB enjoy profits associated with the scan of CMA's barcode.

Allows brand owners to control portions of the retrieved content. Particularly with the use of one-dimensional barcodes, such as the UPC, it is difficult for the brand manager to control the use of their own barcode. This results in the dissemination of inaccurate, fraudulent or time-dated information when the UPC is scanned by mobile barcode readers in the prior art. The "Dual Proprietary and Universal Mobile Barcode Reader" provides the brand owner opportunity to present authorized information anytime one of their UPCs are scanned. For instance, if a consumer were to scan a package of spoiled product, the brand manufacturer may supply up-to-date information on a recall including instruction on identifying lots and advise on returning the product. By placing this additional content in the barcode reader application, the secondary information controlled by brand owners does not interfere with the delivery of the potentially copyrighted information distributed by the brand's authorized partners.

Provides users with related content from a trusted source. Universal readers show the end-user the content without discerning to the end-user if the content is known to the application. So a universal mobile barcode reader supplied by a well-trusted brand name may deliver information which can harm the consumer. This may cause trust erosion for the brand owner and the supplier of the mobile barcode reader. By having the reader of the present invention supply supplemental information about the underlying barcode, both the application provider and the owner of the code can assure consumers the data they are viewing is of the highest quality and from trusted resources. This trust is further enhanced because the mobile barcode reader of the present invention also delivers the original destination information without alteration.

What is claimed is:

1. A method for presenting a plurality of content on a mobile device in a computer network environment, the method comprising:
   a. capturing a barcode with said mobile device;
   b. decoding said barcode into an alphanumeric string on said mobile device;
   c. transmitting, from said mobile device, said alphanumeric string to a code management platform on said computer network environment;
   d. testing, at said code management platform, if said alphanumeric string is content natively hosted at the code management platform or points to a third-party content;
   e. retrieving said third-party content if said testing determines the alphanumeric string points to said third-party content;
   f. forwarding said third-party content to said mobile device if said testing determines the alphanumeric string points to said third-party content;
   g. forwarding said natively hosted content to said mobile device if said testing determines the alphanumeric string is said natively hosted content;
   h. displaying said natively hosted content or the third-party content on said mobile device;
   i. forwarding, as a function of said alphanumeric string, a pairing of an associated content with instructions to load a separate associated content message on said mobile device;

whereby, the associated content message is simultaneously displayed with the natively hosted content or the third-party content on the mobile device.

2. A method of claim 1, wherein said code management platform comprises a plurality of computers.

3. A method of claim 1, wherein said code management platform comprises one computer.

4. A method of claim 1, wherein said alphanumeric string comprises an index.

5. A method of claim 1, wherein said alphanumeric string comprises a Universal Resource Locator.

6. A method of claim 1, wherein said associated content message is displayed as a button.

* * * * *